United States Patent [19]
Kemper

[11] 3,849,047
[45] Nov. 19, 1974

[54] DEVICE FOR PRODUCING A CONTINUOUS DOUGH STRIP

[76] Inventor: Kate Kemper, Wybuelstrasse 6, CH-8702 Zurich-Zollikon, Switzerland

[22] Filed: Jan. 26, 1973

[21] Appl. No.: 326,857

[30] Foreign Application Priority Data
Jan. 28, 1972 Germany............................ 2203969

[52] U.S. Cl. .............................................. 425/238
[51] Int. Cl. ............................................... A21c 5/00
[58] Field of Search ........... 425/238, 239, 240, 241

[56] References Cited
UNITED STATES PATENTS

| | | | |
|---|---|---|---|
| 629,815 | 8/1899 | Pointon et al. ...................... | 425/238 |
| 2,383,536 | 8/1945 | Elliott................................. | 425/239 |
| 2,666,398 | 1/1954 | Gendler et al. ................. | 425/364 B |
| 2,902,950 | 9/1959 | Valentyne et al................... | 425/238 |
| 3,218,994 | 11/1965 | Valentyne........................... | 425/238 |

*Primary Examiner*—Richard J. Herbst
*Attorney, Agent, or Firm*—McGlew and Tuttle

[57] ABSTRACT

The device is operable to produce a continuous dough strip from previously separated pieces of dough. A dough receiving hopper is arranged to contain a mass of dough, and a cylinder is positioned beneath the hopper and has a lateral inlet communicating therewith, as well as an axial outlet. Respective knives are provided to close the inlet and the outlet of the cylinder, and the outlet of the cylinder communicates coaxially with a cylindrical chamber. The knife at the cylinder inlet is operable to separate, from the mass of dough, a piece of dough discharged into the cylinder, and a piston is reciprocable in the cylinder by linkage connected thereto to move the separated piece of dough through the cylinder outlet and into the cylindrical chamber for joining to dough in the chamber to form a continuous strip of dough. A first conveyor receives the strip of dough from the cylindrical chamber, and a second conveyor receives the strip of dough from the first conveyor. The first conveyor is driven step-by-step from the linkage in synchronism with the reciprocation of the piston. A pair of smoothing rollers are disposed between the first and second conveyors to smooth the strip of dough passing therebetween. A strip height adjuster is provided adjacent the outlet end of the cylindrical chamber, and a sensor, near the smoothing rollers, detects an excessive pile-up of the dough strip on the first conveyor and serves to interrupt operation of the piston and the first conveyor until the height of the strip is reduced by drawing of the strip through the smoothing rollers and onto the second conveyor.

14 Claims, 1 Drawing Figure

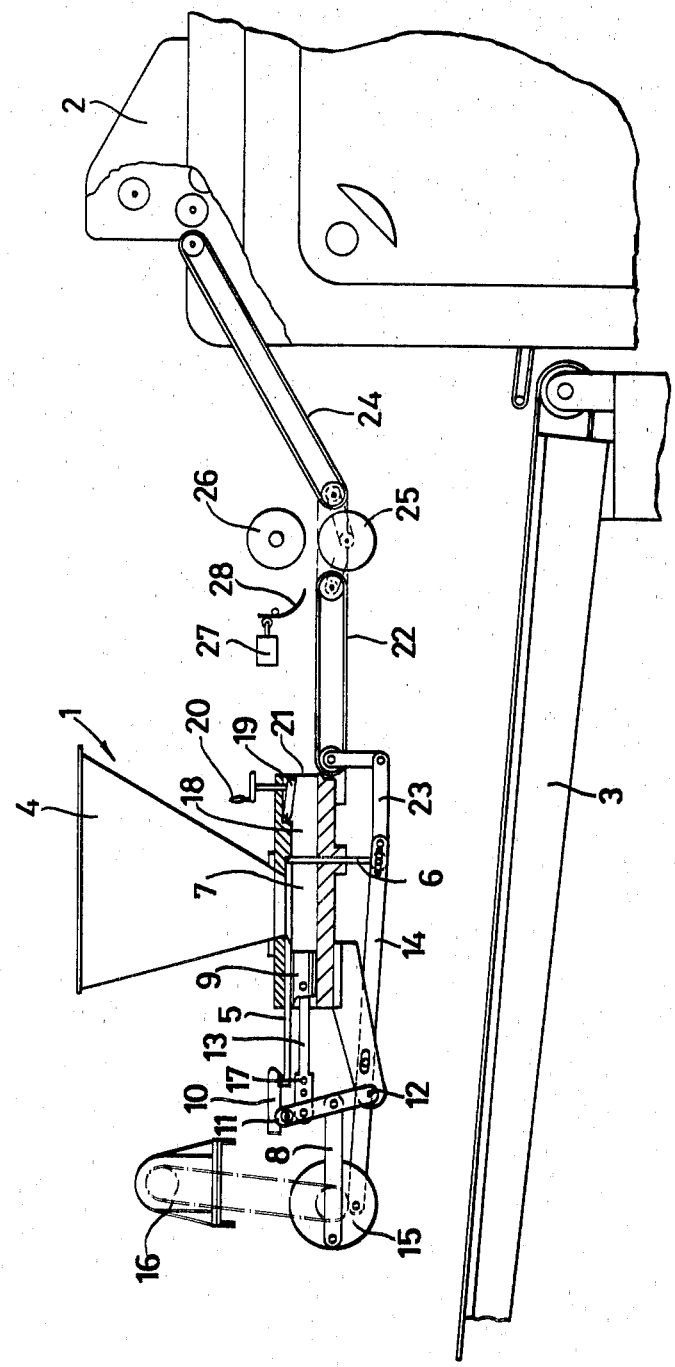

DEVICE FOR PRODUCING A CONTINUOUS DOUGH STRIP

FIELD AND BACKGROUND OF THE INVENTION

The invention relates to a device for producing a continuous dough strip, particularly one of constant but variable layer thickness and width.

Devices for dough moulding in fully-automatic dough dividing and kneading machines are already known, in which the dough is fed from a feed hopper or from a delivery belt through a roller system of a plurality of rollers of the machine, which rollers are opposite and below each other.

A disadvantage of this known feed device resides particularly in that, in spite of pressure chambers provided for the compression of the dough, a uniform compact dough strip cannot always be produced. In so doing there often occurs tearing of the dough upper surface, which has a disadvantageous effect, particularly in the dough dividing process, in relatively large weight differences of the individually divided-up dough pieces.

There occurs further, as a result of the tearing of the dough upper surface, an adhesion of the dough in the machine, whereby considerable disturbances occur during the subsequent kneading process and thus in the entire production cycle.

These difficulties cannot be easily avoided when using roller systems, for if the rollers, for example, are provided with a dough releasing coating, so that they do not stick, the entrainment of the dough is endangered and, on the other hand, if they are not treated in a dough releasing manner, so that an unobjectionable transport is ensured, there exists the danger that the dough will remain stuck to these rollers.

Even the use of strippers does not solve this problem since here the dough is indeed removed from the rollers, but is already torn up.

The use of roller systems for producing a continuous dough strip from a still unwieldy batch of dough requires a two-sides arrangement of axially parallel rollers rotating in the same direction which touch each other frictionally in order to prevent the dough residues arriving in regions which are not intended or suited therefor. Such an arrangement is, for example, to be presupposed from the German Disclosure Document 1 632 341. The roller arrangements are therefore subjected to a constant frictional wear, whereby an increased energy consumption is necessary and a relatively large wear of the roller surfaces occurs.

There are further known devices for the continuous metering of dough, which are used for dough dividing machines and require dough types of higher consistency, however, with the divided-up portions being different and depending on the amount of dough in the storage hopper. For these reasons the hitherto known devices for metering wheat dough have only a relatively small storage hopper, in which the dough is inserted manually in small portions of a few kilogrammes, each flat dough cake supplied having to be spread out manually over the whole width of the feed belt or of the storage hopper. Also in this case it is not possible, or possible only with difficulty, to provide the flat dough cakes with a closed upper surface layer and to achieve a uniform dough consistency, as well as to produce the flat dough cakes with a somewhat constant cross-section.

SUMMARY OF THE INVENTION

The invention seeks to avoid or reduce some or all of the disadvantages of the hitherto described known devices.

The invention in this case is based on the recognition that it is possible to rejoin a strand of dough separated by a smooth cut in such a manner that the joints completely disappear. This recognition makes it possible to start from the hitherto used roller system for the primary dough forming and to use a system which is already used in a developed form during the dough dividing.

According to the invention, there is provided a device for producing a continuous dough strip comprising a dough receiving container, a cylinder having an input connected to an output of the dough receiving container for receiving dough therefrom and having an output for dough, means for closing the cylinder input and output, and a piston in the cylinder for discharging dough from the cylinder output.

Preferably the closing means comprise knives.

The knives for closing the cylinder input may be coupled to the piston linkage in such a manner that the knife movement always leads with respect to the piston movement.

The knife for closing the cylinder output may be non-positively connected by means of a linkage to the drive of the piston, it being closed in the case of a piston intake movement and opened with a piston discharge movement.

In order to make the operating range of the device variable, it is advantageous to make the volume of the piston cylinder variable by varying the piston stroke.

The piston cylinder is preferably attached to an output chamber, the volume of which is somewhat of the same order of magnitude as the piston cylinder volume. By this it can be achieved that the dough, discharged by the piston, is again homogeneously joined to the already previously discharged dough which is found in the output chamber. The output chamber may have a nozzle with variable cross-section at its output. A tongue, which is variable with respect to height, may be arranged in the horizontally running part of the nozzle, particularly for changing the height of the cross-section of the same. With this, the discharged amount of dough can be adapted to the required situation in a variable manner. A first transport device may be connected to the nozzle, which transport device may be movable stepwise and synchronously with the piston. In this case, it is advantageous to connect, in a non-positive manner, the first transport device to the piston drive by means of a free-running coupling and a linkage. Further arranged between the first and a second transport device may be at least one pair of rollers, which is driven with a second transport device by the dividing machine and synchronously therewith. The basic idea of this pair of rollers consists in that the strand of dough passing through continuously is smoothed, so that an unobjectionable upper surface and consistency of the same can be achieved. In order to compensate for stresses found inside the dough strand, each roller of a pair of rollers may be provided with an outer surface in the form of a barrel arch. The roller spacing can also be made variable to match the variability of the cross-section of the nozzle. In each case it may be sufficient merely to drive the lower roller, the one located thereabove being entrained by the strand of dough.

A measuring sensor for measuring the dough height, which sensor is directly coupled to the piston drive for transmitting measuring pulses, may be arranged in front of the pair of rollers, in the transport direction of the dough. When a no longer allowable dough height is present in front of the pair of smoothing rollers, in which case the measuring sensor may transmit measuring pulses to the piston drive so that the piston movement and thus the further feed of dough are interrupted until the dough height, in front of the pair of smoothing rollers, is again reduced to an allowable amount. This is possible, because the second conveying device and the pair of rollers can continue to operate during the stoppage of the first transport device.

The device in accordance with the invention can be suitable, in an advantageous manner, for the production of a continuous dough strip which is fed to a dough dividing and a circular kneading device. In such a case, the second conveying device may be so constructed that the dough strip can be fed directly to the dough dividing device. In this case it is appropriate, but not necessary, to synchronize the piston drive of the first transport device with the drive of the second transport device and the dough dividing and circular kneading device.

However, even a scale balance, known per se, can be connected downstream of the device in accordance with the invention, so that it can be used in weighing machines.

BRIEF DESCRIPTION OF THE DRAWING

One embodiment of the invention will now be described by way of example, with reference to the drawing, the single FIGURE of which shows one form of the invention.

DESCRIPTION OF THE PREFERRED EMBODIMENT

In this exemplary embodiment, the device 1 for producing a continuous dough strip is connected upstream of a dough dividing and circular kneading device 2 and arranged over an expansion conveyor 3.

The device in accordance with the invention comprises individually a dough receiving container 4 below which is located a piston cylinder 7, which is sealable on the input and output side by movable knives 5 or 6 respectively, in which piston cylinder is slidably mounted a piston 9 which can be moved by a linkage 8 for the dough transport. The knife 5, arranged on the input side to close the piston cylinder 7 with respect to the dough receiving vessel 4, is coupled to the linkage 8 by means of an entrainment means 10 and a lever 11 in such manner that the movement of the knife 5 always leads with respect to the movement of the piston 9. This is substantially achieved in that the lever 11 is swivelled by the linkage 8 about a pivot 12, the spacing of the pivots of the piston driver rod 13 and the entrainment means 10 on the lever 11 determining the degree of lead. The knife 6 serving for the output side closure of the piston cylinder 7 is connected non-positively to the piston drive 15 by means of a linkage 14. The piston drive 15, comprising an entrainment disc arranged on an axle, is, in turn, actuated by an electric motor 16. The linkage 14 for the knife 6 and the linkage 8 for the drive of the piston 9 and of the knife 5 by means of the lever 11 are non-positively connected rotatably to the piston drive in such a manner that, with a piston intake movement, the knife 6 closes the cylinder 7 and, with a piston discharge movement, opens the same. The volume of the piston cylinder 7 can, for coarse adjustment, be varied by variation of the piston stroke, the piston driver rod 13 being secured to the lever 11 in an adjustable manner. The openings 17 in the piston driver rod 13 serve for this purpose.

Arranged in front of the piston cylinder 7 is an output chamber 18, the volume of which is, say, in the same order of magnitude as the piston cylinder volume. At the output of the output chamber 18 are provided means for varying the cross-section. Particularly for altering the height of the cross-section of the nozzle, there is secured in the horizontally running part of the chamber 18, a tongue 19 swingable about a pivot. The pivoting movement, and thus the adjustment, can be effected by an adjusting device 20, which is constructed, for example, as an adjusting wheel. If, in particular, dextrin dough is moved through a piston cylinder, there follows thereafter a certain swelling which can be taken into account by corresponding adjustment of the adjusting device 20 so that a largely constant dough strip height is achieved. A first transport device 22 is connected to the output chamber 18 or the nozzle 21, which device is driven stepwise and synchronously with the piston 9 by means of a linkage 23 which is non-positively connected to the piston drive 15. A free-running coupling, which is not shown in any detail, is provided for this purpose between the linkage 23 and the transport device 22. Here is arranged, between the first transport device 22 and a second transport device 24, a pair of rollers which comprises rollers 25 and 26, which run with their axes parallel, the roller 25 being non-positively connected to the transport device 24 and thus executing the same step sequence. The roller 26 is appropriately mounted in a free-running manner. The entrainment is effected in this case by the dough strip. Each roller 25 and 26 has a surface in the form of a barrel arch and the roller spacing is variable so that the dough conversion can be adapted to the subsequent processing machines.

In the transport direction of the dough, there is provided, in front of the pair of rollers 25 and 26, a measuring sensor 27 which is equipped with a scanner 28 for scanning the dough height on the conveyor belt 22. The measuring sensor 27 is coupled electrically, by means known per se and not shown in any detail, to the piston drive 15 for the transmission of measuring pulses. If, for example, the whole working cycle is not exactly synchronized, so that possibly a dough height which is no longer admissible occurs in front of the smoothing rollers 25 and 26, this height is measured by the scanner 28 and converted by the measuring sensor 27 into electrical pulses which are fed to the piston drive 15 and there cause the operation of the entire piston device with the transport device 22 to be interrupted until the dough height in front of the rollers 25 and 26 has again reached an admissible height. When this is achieved by the further processing transport device 24 and rollers 25, 26, the scanner causes, by means of the measuring sensor 27, a restart of the piston drive so that the dough transport is continued quasi continuously, i.e. in a stepwise manner. The chronological operating sequence of this operation just described, however, is so carried out that the elasticity of the dough strip can be exploited without the dough upper surface tearing. The second transport device 24, which is synchronized in a driving manner with the dough dividing and kneading machine 2, is obliquely arranged in an advantageous manner so that the transported dough has to pass upwardly over an inclined plane. By this, a further settling of the dough, that effects a homogenization of the stresses in the dough, is achieved.

The drive of the device 1 for producing a continuous dough strip is appropriately synchronized with the drive of the subsequent processing machines, for example the drive of the dough dividing and circular kneading device 2. Thus a fully automatic and frictionless operating sequence can be achieved without manual interference being necessary.

The device according to the invention can now permit a sufficient quantity of dough to be fed to the dough receiving container 4 so that certain subsequent operating processes can be concluded.

With the device as described above it is no longer necessary to feed flat dough cakes manually, whereby a complete homogenization of the dough band produced is achieved so that subsequent dough dividing can be carried out without loss of volume.

In addition to the elimination of the already-stated disadvantages in the case of known devices of the corresponding type, however, in the case of the above described device, a further advantage is achieved in which the produced continuous dough strip is exposed for a certain time to the atmosphere before further processing. In this way, the dough still has available a certain rest time for tension release, since the finished state has not been completed. Moreover, in this way the state of the consistency of the dough can be observed and still be correspondingly influenced. Thus, the dough can, for example, still in an advantageous manner, dry out or can be floured. All of these possibilities are not present in the case of the known devices. On the other hand, the dough is handled by the piston device in a protective manner and is subjected to no great compression, since the piston chamber 7 substantially corresponds with the cross-sectional shape of the output chamber 18 and the height adjustment at the nozzle 21 by the tongue 19 which can be varied with respect to height is only relatively slight.

When ejecting the dough from the output chamber 18 through the agency of the dough located in the piston cylinder 7, there arises at the nozzle a relatively smooth and dense surface layer on the dough, which is already such that no adhesion to the smoothing rollers 25 and 26 any longer occurs. These rollers 25 and 26, however, still compensate for the last unevenness so that the dough strip, which is fed to the dough dividing and circular kneading device 2, is completely homogeneously formed.

The device above described thus contributes to automation of the operating sequences of dough-treating and dough-processing machines, to standardize the dough state at least throughout a batch, so that the end product is also substantially improved with regard to its quality, its uniform size and its state.

What we claim is:

1. A device for producing a continuous strip of dough, having an adjustable constant height and width, and feeding the strip into a dough working machine, said device comprising, in combination, a dough receiving hopper arranged to contain a mass of dough and having a discharge mouth; a cylinder positioned beneath said hopper and having a lateral inlet, communicating with said discharge mouth, and an axial outlet; respective closing means operable to close said inlet and said outlet, the closing means at said inlet being operable to separate, from the mass of dough, a piece of dough discharged through said inlet into said cylinder; a cylindrical chamber, having a diameter substantially equal to that of said cylinder and open at both ends, communicating coaxially with said outlet; a piston reciprocable in said cylinder; means, including a linkage connected to said piston, operable to advance said piston to move a separated piece of dough in said cylinder through said outlet and into said chamber for joining to dough in said chamber to form a continuous strip of dough, and to retract said piston beyond said inlet; a first transport device positioned to receive the dough strip from said cylindrical chamber; first driving means connecting said first transport device to said linkage for step-by-step operation of said first transport device in synchronism with reciprocation of said piston; a second transport device positioned to receive the dough strip from said first transport device, and driven by the dough working machine; and dough strip smoothing roller means between said first and second transport devices and driven in synchronism with said second transport device.

2. A device as claimed in claim 1, wherein the closing means comprise movable knives.

3. A device as claimed in claim 2, including means coupling a first knife, for closing the cylinder inlet, to said linkage in a manner such that said first knife closing movement always leads the piston advance movement.

4. A device as claimed in claim 2, including means connecting a second knife, for closing the cylinder outlet, non-positively to said linkage for closing movement of said second knife responsive to piston retraction and opening movement of said second knife responsive to piston advance.

5. A device as claimed in claim 1, in which said piston is adjustably coupled to said linkage for varying the piston stroke to vary the volume of said cylinder.

6. A device as claimed in claim 1, in which said cylindrical chamber has a volume corresponding in magnitude approximately to the volume of said cylinder.

7. A device as claimed in claim 6, wherein said cylindrical chamber has an outlet end with a variable cross-section.

8. A device as claimed in claim 7, including a tongue pivotally mounted in said cylindrical chamber at its outlet end and adjustable to vary the height cross-section of said outlet end.

9. A device as claimed in claim 1, wherein said smoothing roller means comprises a pair of vertically spaced rollers rotatable about parallel axes, at least one of said rollers being driven in synchronism with said second transport device.

10. A device as claimed in claim 1, wherein said first transport device is non-positively connected to the piston linkage by means of a free-running coupling and a linkage.

11. A device as claimed in claim 9, wherein each roller of the pair of rollers has an axially convex surface.

12. A device as claimed in claim 11, wherein the roller spacing is variable.

13. A device as claimed in claim 9, wherein a measuring sensor for measuring dough height is arranged, in the transport direction of the dough, in front of the pair of rollers, for electrical connection to the piston drive means for transmitting measuring pulses.

14. A device as claimed in claim 1, wherein said dough working machine comprises a dough dividing and circular kneading device receiving the continuous dough strip from said second transport device.

* * * * *